(12) United States Patent
Stanwood

(10) Patent No.: US 8,537,769 B2
(45) Date of Patent: *Sep. 17, 2013

(54) METHOD AND APPARATUS FOR EFFICIENT BANDWIDTH UTILIZATION FOR SUBSCRIBER UNIT INITIALIZATION AND SYNCHRONIZATION IN A TIME-SYNCHRONIZED COMMUNICATION SYSTEM

(75) Inventor: Kenneth L. Stanwood, Vista, CA (US)

(73) Assignee: Harington Valve, LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,448

(22) Filed: Jan. 12, 2012

(65) Prior Publication Data

US 2012/0113954 A1    May 10, 2012

Related U.S. Application Data

(63) Continuation of application No. 12/643,324, filed on Dec. 21, 2009, now Pat. No. 8,111,659, which is a continuation of application No. 11/513,297, filed on Aug. 29, 2006, now Pat. No. 7,668,152, which is a continuation of application No. 11/270,430, filed on Nov. 8, 2005, now Pat. No. 7,860,076, which is a continuation of application No. 09/629,569, filed on Jul. 31, 2000, now Pat. No. 6,977,919.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| 5,297,144 A | 3/1994 | Gilbert et al. |
| 5,444,698 A | 8/1995 | Kito |

(Continued)

FOREIGN PATENT DOCUMENTS

| EP | 0507384 A2 | 3/1992 |
| EP | 0845916 A2 | 12/1997 |
| EP | 0891060 A2 | 6/1998 |
| WO | 9222162 A1 | 12/2002 |

OTHER PUBLICATIONS

Sampei, et al. "Adaptive Modulation/TDMA Scheme for Personal Multi-Media Communication Systems" Proceedings of the Global Telecommunication Conference, U.S. New York, IEEE, Nov. 28, 1994, pp. 989-993.

(Continued)

*Primary Examiner* — Anh-Vu Ly
(74) *Attorney, Agent, or Firm* — Schwabe, Williamson & Wyatt, P.C.

(57) ABSTRACT

A bandwidth efficient subscriber unit initialization and synchronization method and apparatus is described. The inventive subscriber unit initialization and synchronization method and apparatus uses a combination of an access burst format and a data transportation technique to efficiently use bandwidth when initializing and synchronizing subscriber units in a time-synchronized communication system. Advantageously, the present invention provides a mechanism for a base station to receive multiple access bursts from multiple subscriber units in a single contiguous time period. In the preferred embodiment of the present invention, bandwidth is efficiently utilized by searching for multiple initial access bursts from multiple mobile stations during a single time period known as a new access opportunity. The preferred embodiment of the present invention initializes and synchronizes subscriber units in a "contention-based" manner.

14 Claims, 10 Drawing Sheets

(56) References Cited

U.S. PATENT DOCUMENTS

| | | | |
|---|---|---|---|
| 5,615,212 | A | 3/1997 | Ruszczyk et al. |
| 5,638,371 | A | 6/1997 | Raychaudhuri et al. |
| 5,638,374 | A | 6/1997 | Heath |
| 5,644,576 | A | 7/1997 | Bauchot et al. |
| 5,675,573 | A | 10/1997 | Karol et al. |
| 5,751,708 | A | 5/1998 | Eng et al. |
| 5,822,311 | A | 10/1998 | Hassan et al. |
| 6,014,562 | A | 1/2000 | Weiss |
| 6,016,311 | A | 1/2000 | Gilbert et al. |
| 6,094,421 | A | 7/2000 | Scott |
| 6,115,390 | A | 9/2000 | Chuah |
| 6,175,737 | B1 | 1/2001 | Kao |
| 6,477,151 | B1 | 11/2002 | Oksala |
| 6,567,416 | B1 | 5/2003 | Chuah |
| 6,574,212 | B1 | 6/2003 | Jurgensen et al. |
| 6,707,807 | B1 | 3/2004 | Menzel |
| 6,741,614 | B1 | 5/2004 | Porter et al. |
| 6,925,068 | B1 | 8/2005 | Stanwood et al. |
| 6,977,919 | B1 | 12/2005 | Stanwood |
| 7,359,406 | B2 | 4/2008 | Holloway et al. |
| 7,668,152 | B2 | 2/2010 | Stanwood |
| 7,860,076 | B2 * | 12/2010 | Stanwood ............ 370/348 |
| 8,111,659 | B2 * | 2/2012 | Stanwood ............ 370/329 |
| 2001/0016504 | A1 | 8/2001 | Dam et al. |
| 2004/0246891 | A1 | 12/2004 | Kay et al. |
| 2006/0062236 | A1 | 3/2006 | Stanwood |

OTHER PUBLICATIONS

Redl, et al., "An Introduction to GSM", Artech House, Boston, London 1995, pp. 84-85 and 95.

Ue, et al., "Symbol Rate and Modulation Level Controlled Adaptive Modulation/TDMA/TDD for Persona Communication Systems", Proceedings of the Vehicular Technology Conference, U.S., New York, IEEE, vol. Conf. 45, Jul. 15, 1995, pp. 306-310.

Ulm, et al. "Data-Over-Cable Interface Specifications, Radio Frequency Interface Specification", Hewlett Packard Interim Specification, Doc. Control No. SP-RFII01-970321, published Mar. 21, 1997, by MCNS Holdings, L.P., Section 6, pp. 43-85.

Office Action mailed Nov. 24, 2003 for U.S. Appl. No. 09/629,569.
Office Action mailed May 6, 2004, for U.S. Appl. No. 09/629,569.
Office Action mailed Jan. 18, 2005, for U.S. Appl. No. 09/629,569.
Reasons for Allowance mailed Jul. 21, 2005, for U.S. Appl. No. 09/629,569.
Office Action mailed Sep. 16, 2008, for U.S. Appl. No. 11/270,430.
Office Action mailed Apr. 2, 2009, for U.S. Appl. No. 11/513,297.
Final Office Action mailed mailed Aug. 6, 2009, for U.S. Appl. No. 11/270,430.
Reasons for Allowance mailed Sep. 9, 2009, for U.S. Appl. No. 11/513,297.
Office Action mailed Nov. 9, 2009 for U.S. Appl. No. 11/270,430.
Office Action mailed Mar. 23, 2010 for U.S. Appl. No. 11/270,430.
Office Action mailed Jun. 11, 2010 for U.S. Appl. No. 11/270,430.
Notice of Allowance for U.S. Appl. No. 11/270,430, mailed on Aug. 20, 2010.
Office Action for U.S. Appl. No. 12/643,324, mailed on Nov. 22, 2010.
Office Action for U.S. Appl. No. 12/643,324, mailed on Apr. 6, 2011.
Notice of Allowance for U.S. Appl. No. 12/643,324, mailed on Oct. 19, 2011.

* cited by examiner

METHOD AND APPARATUS FOR EFFICIENT BANDWIDTH UTILIZATION FOR SUBSCRIBER UNIT INITIALIZATION AND SYNCHRONIZATION IN A TIME-SYNCHRONIZED COMMUNICATION SYSTEM

CROSS-REFERENCE TO RELATED APPLICATIONS

This application is a continuation of U.S. patent application Ser. No. 12/643,324, filed Dec. 21, 2009, which is a continuation of U.S. patent application Ser. No. 11/513,297, filed Aug. 29, 2006 (issued as U.S. Pat. No. 7,668,152 on Feb. 23, 2010), which is a continuation of U.S. patent application Ser. No. 11/270,430, filed on Nov. 8, 2005 (issued as U.S. Pat. No. 7,860,076 on Dec. 28, 2010), which is a continuation of U.S. patent application Ser. No. 09/629,569, filed on Jul. 31, 2000 (issued as U.S. Pat. No. 6,977,919 on Dec. 20, 2005).

This application is also related to U.S. Pat. No. 6,016,311, issued Jan. 18, 2000, entitled "An Adaptive Time Division Duplexing Method and Apparatus for Dynamic Bandwidth Allocation within a Wireless Communication System", and U.S. Pat. No. 6,925,068, issued Aug. 2, 2005, entitled "Method and Apparatus for Allocating Bandwidth in a Wireless Communication System."

The patents and co-pending applications are hereby incorporated by reference herein for their teachings on wireless communication systems.

BACKGROUND OF THE INVENTION

1. Field of the Invention

This invention relates to communication systems, and more particularly to a method and apparatus for efficiently using bandwidth for subscriber unit initialization and synchronization in a time-synchronized communication system.

2. Description of Related Art

Time-synchronized communication systems are essential in modern society. Time-synchronized communication systems typically comprise sets of subscriber units or stations that communicate with one another. The communication system is "time synchronized" because a set of subscriber units is typically synchronized to a single time reference. Examples of time-synchronized communication systems include wireless communication systems and cable modem systems. As described in the commonly assigned related U.S. Pat. No. 6,016,311, wireless communication systems facilitate two-way communication between a plurality of subscriber radio stations or subscriber units (fixed and portable) and a fixed network infrastructure. Exemplary wireless communication systems include broadband wireless, satellite communication, mobile cellular telephone systems, personal communication systems (PCS), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes, a time "frame" is used as the basic information transmission unit. Each frame is sub-divided into a plurality of "time slots". Some time slots are used for control purposes and some for information transfer. Subscriber units typically communicate with a selected base station using a "duplexing" scheme thus allowing for the exchange of information in both directions of connection.

Transmissions from the base station to the subscriber unit are commonly referred to as "downlink" transmissions. Transmissions from the subscriber unit to the base station are commonly referred to as "uplink" transmissions. Downlink and uplink transmissions comprise "bursts" that are defined herein as data packets utilized for transmitting information between the base stations and the subscriber units. The base station maps and allocates bandwidth for both the uplink and downlink communication links. These maps are developed and maintained by the base station and are referred to as the Uplink Sub-frame Maps and Downlink Sub-frame Maps.

Propagation delays (i.e., time delays in transmissions between a transmitting unit and a receiving unit due to the distance or range between the units) occur within most communication systems. In time-synchronized communication systems, propagation delays must be determined because subscriber units are time synchronized to their respective base stations' time reference. Because a base station typically communicates with a plurality of subscriber units, the base station assigns to each subscriber unit unique time frames for receiving transmissions from the subscriber unit. Thus, a subscriber unit must transmit a burst to its associated base station during a particular designated time frame. For a burst to arrive from the subscriber unit to the base station "on time" (i.e., upon the occurrence of its designated time frame) the particular time of transmission should take into account propagation delays.

One example of time-synchronized communication is now described. In a wireless communication system, bursts travel through the atmosphere at approximately the speed of light (i.e., $3*10^8$ m/s). If the range between a subscriber unit and its associated base station is 5 km, the propagation delay is 16.67 microseconds (3.33 microseconds/km*5 km). Thus, a base station sending a message to a subscriber unit has a propagation delay of 16.67 microseconds. The subscriber unit's response to the base station has another associated propagation delay of 16.67 microseconds. Thus, the round-trip propagation delay (i.e., total delay for a burst to travel from the base station to the subscriber unit and for the subscriber unit to respond to the burst by sending a message to the base station) is approximately 33.3 microseconds (16.67+16.67). Round-trip delay is also commonly referred to as "Tx time advance". For a subscriber unit to be time-synchronized to the base station's time reference, the subscriber unit therefore must transmit its burst 33.3 microseconds early. Time-synchronization between a subscriber unit and a base station consequently depends upon knowledge of the round-trip delay or range between the subscriber unit and the base station.

Disadvantageously, problems occur during initialization processes between the base station and the subscriber units. Problems occur when a subscriber unit initially accesses the base station because the subscriber unit's round-trip delay (or range) is initially unknown. If the round-trip delay is unknown, a burst can arrive at a time frame assigned to a different subscriber unit and thereby cause "collisions" (i.e., bursts from different subscriber units arrive at the base station simultaneously). Collisions can degrade a communication system's performance because a base station can typically receive transmissions (i.e., bursts) from only one subscriber unit at any given moment in time. Thus, a mechanism for providing initialization and synchronization between a plurality of subscriber units and their associated base station is needed.

One method for providing initialization and synchronization between a plurality of subscriber units and base stations is known as the "Random Access Burst" (RAB) method and is described in detail in a book by Siegmund M. Redl, Matthias K. Weber and Malcolm W. Oliphant; entitled "An Introduction to GSM" appearing at section 5.8.2 (pages 84, 85 and 95), published in 1995, and hereby incorporated by reference herein for its teachings on initialization and synchronization procedures in wireless communication systems. The RAB method described by Redl et al. takes advantage of "timing opportunities" (periods of time assigned for subscriber unit initialization and synchronization purposes) during which subscriber units that have not resolved their round-trip delay or Tx time advance (i.e., not yet synchronized with the base station's time reference) may transmit without interfering with other subscriber units that have already resolved their round-trip delay or Tx time advance (i.e., subscriber units that have already synchronized with the base station's time reference). In the RAB method, a subscriber unit utilizes a "random access burst" when initially attempting to communicate with its associated base station.

FIG. 1 shows the structure of a random access burst in accordance with the Random Access Burst method. The random access burst comprises message bits (m) 2 and guard bits (g) 4. The message bits 2 contain information regarding synchronization and identification of the subscriber unit. The length of the message bits 2 determines a time period known as the "m" time period because each bit requires a certain length of time to transmit. The guard bits 4 provide a mechanism for preventing collisions. The length of the guard bits 4 determines a time period known as the "g" time period. The g time period represents the maximum round trip delay possible in a communication system (i.e., a situation where the subscriber unit is at a maximum distance from the base station as determined by the base station's capabilities). For example, in a wireless communication system wherein the maximum distance from the subscriber to the base station is 37.75 km, the maximum round trip distance is 75.5 km (2*37.75). Thus, the maximum round trip delay is approximately 252 microseconds (75.5 km*3.33 μs/km). In the example, the length of the guard bits 4 must be a minimum of 68.25 bits because each guard bit requires 3.69 microseconds to transmit (i.e., 252 μs/3.69 μs/bit=68.25 bits).

The RAB method reserves various time frames in the uplink called "timing opportunities" for subscriber units that have not resolved their round-trip delay or Tx time advance (i.e., subscriber units that have not yet synchronized with the base station's time reference). A timing opportunity must be sufficient in duration to accommodate subscriber units that are at the maximum range of the base station. Thus, referring to FIG. 1, the duration of the timing opportunity must be equal to at least the time period represented by the random access burst (i.e., m time period+g time period) in order to accommodate a subscriber unit that is at a maximum range from the base station.

FIG. 2 shows the time sequence of a random access burst arriving at a timing opportunity in accordance with the Random Access Burst method. In FIG. 2, a timing opportunity exists at a time frame n of an Uplink Sub-frame (as described in more detail below with reference to FIG. 3). As shown in FIG. 2, the timing opportunity begins at an instant in time known as a "Start of Opportunity" time instant and ends at an instant in time known as an "End of Opportunity" time. In accordance with the RAB method subscriber units begin transmitting a random access burst at the Start of Opportunity time (i.e., at the beginning of a timing opportunity). As shown in FIG. 2, the message bits 2 arrive at the base station at a later time known as an "Arrival of Message" time instant. The time period between the Start of Opportunity time instant and the Arrival of Message time is known as a "$T_{twoway}$" period of the random access burst. The base station can calculate a round-trip delay because the $T_{twoway}$ period's time duration is equal to the round-trip delay's time duration. The time period it takes for a burst to transmit between the base station and a subscriber unit is known as the "$T_{oneway}$" period of the random access burst. The $T_{oneway}$ period is exactly one-half of the $T_{twoway}$ period. The message bits 2 transmission terminate at a time known as an "End of Message" time instant. The time period between the End of Message time and the End of Opportunity time instant is known as an "Unused Time" period because no information is received during this time period.

The g time period (FIG. 1) is equal to the sum of the Unused Time period and the $T_{twoway}$ time period. The Unused Time period is required in order to accommodate the possibility of a maximum round trip delay. Only subscriber units that are at a maximum distance away from the base station have Unused Time periods of zero microseconds. As most subscriber units are within the maximum distance from the base station, Unused Time periods are typically greater than zero microseconds.

In accordance with the RAB method, only one subscriber unit can synchronize with the base station's time reference during a time opportunity. FIG. 3 shows an exemplary Uplink Sub-frame Map of the Random Access Burst method. As shown in FIG. 3, the RAB method schedules timing opportunities (R) 8 at separate and distinct time frames. The exemplary Uplink Sub-frame Map of FIG. 3 comprises 51 time frames consecutively numbered from 0 to 50. As described above with reference to FIG. 1, each timing opportunity 8 must be sufficient in duration to accommodate subscriber units that are at the maximum range of the base station.

Disadvantageously, the RAB method inefficiently allocates bandwidth because a base station desiring to receive x subscriber units that have not resolved their Tx time advance, where x is an integer, must allocate at least x(m+g) total time to minimize burst collisions. Burst collisions may occur because timing opportunities are typically directed to more than one subscriber unit. For example, a base station desiring to receive 5 subscriber units must allocate at least 5(m+g) total time to minimize burst collisions. As shown in FIG. 2, subscriber units that are within the maximum distance from the base station have an Unused Time period greater than zero microseconds. The Unused Time period decreases the overall bandwidth of a communication system because during this unused time period data is neither transmitted nor received. Therefore, bandwidth allocation using the RAB method is inefficient and the RAB method therefore disadvantageously suffers from a decrease in overall bandwidth availability.

Therefore, a need exists for a method and apparatus for efficiently using bandwidth for initial communication and synchronization in a time-synchronized communication system. The method and apparatus should decrease the amount of bandwidth that a communication system requires for initial synchronization purposes, thereby increasing the overall bandwidth availability. Such method and apparatus should be efficient in terms of the amount of bandwidth consumed by the initial synchronization message that is exchanged between the plurality of subscriber units and their associated base stations. The present invention provides such an initial communication and synchronization method and apparatus.

SUMMARY OF THE INVENTION

The present invention is a method and apparatus for efficiently using bandwidth for subscriber unit initialization and synchronization in a time-synchronized communication system. The present invention includes a powerful means for efficiently using bandwidth in a time-synchronized communication system. The subscriber unit initialization and synchronization method and apparatus uses a combination of an access burst format and a data transportation technique to efficiently use bandwidth in a time-synchronized communication system. Advantageously, the present invention provides a mechanism for a base station to receive multiple access bursts from multiple subscriber units in a single contiguous time period.

In a preferred embodiment of the present invention, bandwidth is efficiently utilized by searching for multiple initial access bursts from multiple mobile stations during a single time period known as a new access opportunity. The preferred embodiment of the present invention initializes and synchronizes in a "contention-based" manner during the single time period. The term "contention-based" refers to the possibility of two or more access bursts (m) arriving at the base station simultaneously, thus producing a collision. Advantageously, the present invention decreases the amount of bandwidth allocated for initializing mobile stations because the use of the new access opportunity allows multiple initial access bursts to be received in a relatively short time period. Thus, the amount of bandwidth wasted on unused time periods is reduced.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The preferred embodiment of the present invention is a method and apparatus for efficiently using bandwidth for access and ranging in a time-synchronized communication system. The present invention efficiently utilizes bandwidth by searching for multiple initial access bursts from multiple mobile stations during a single time period known as a new access opportunity. Therefore, a base station can receive initial access bursts from multiple mobile stations during one contiguous time period of an uplink sub-frame map. Advantageously, the present invention decreases the amount of bandwidth required for initializing subscriber stations because the use of one contiguous time period allows multiple initial access bursts to be received in a relatively short time period. Thus, Wasted bandwidth due to unused time periods (i.e., periods where data is neither received nor transmitted) is reduced. An exemplary time-synchronized communication system for use with the present access and ranging invention is now described.

Figure 1:
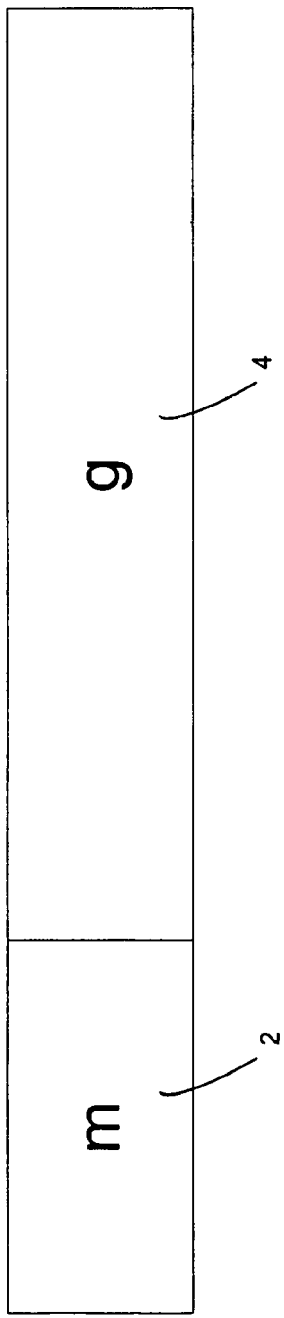
FIG. 1 shows the data structure of a random access burst used to practice the Random Access Burst method for providing initialization and synchronization between a plurality of subscriber units and base stations.
Figure 2:
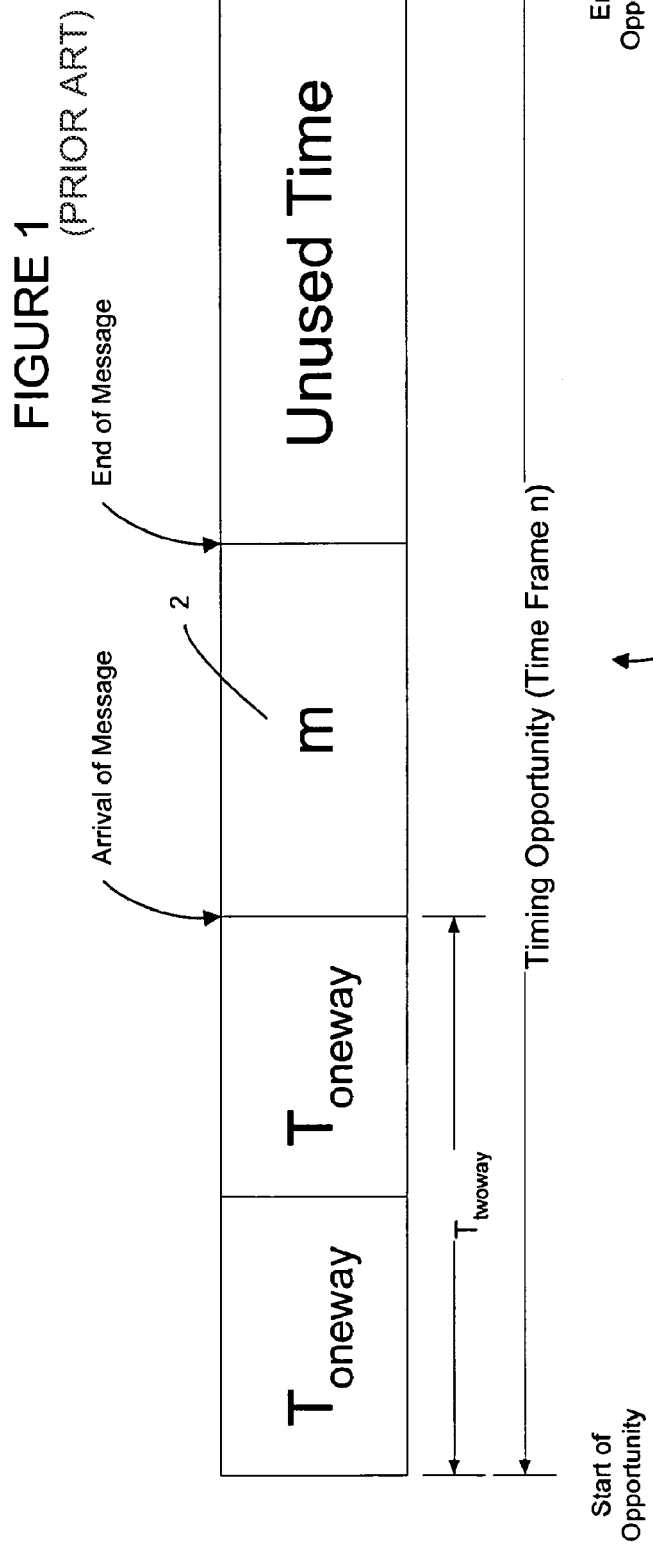
FIG. 2 shows the timing sequence of the random access burst of FIG. 1 shown arriving at a timing opportunity in accordance with the Random Access Burst method.
Figure 3:
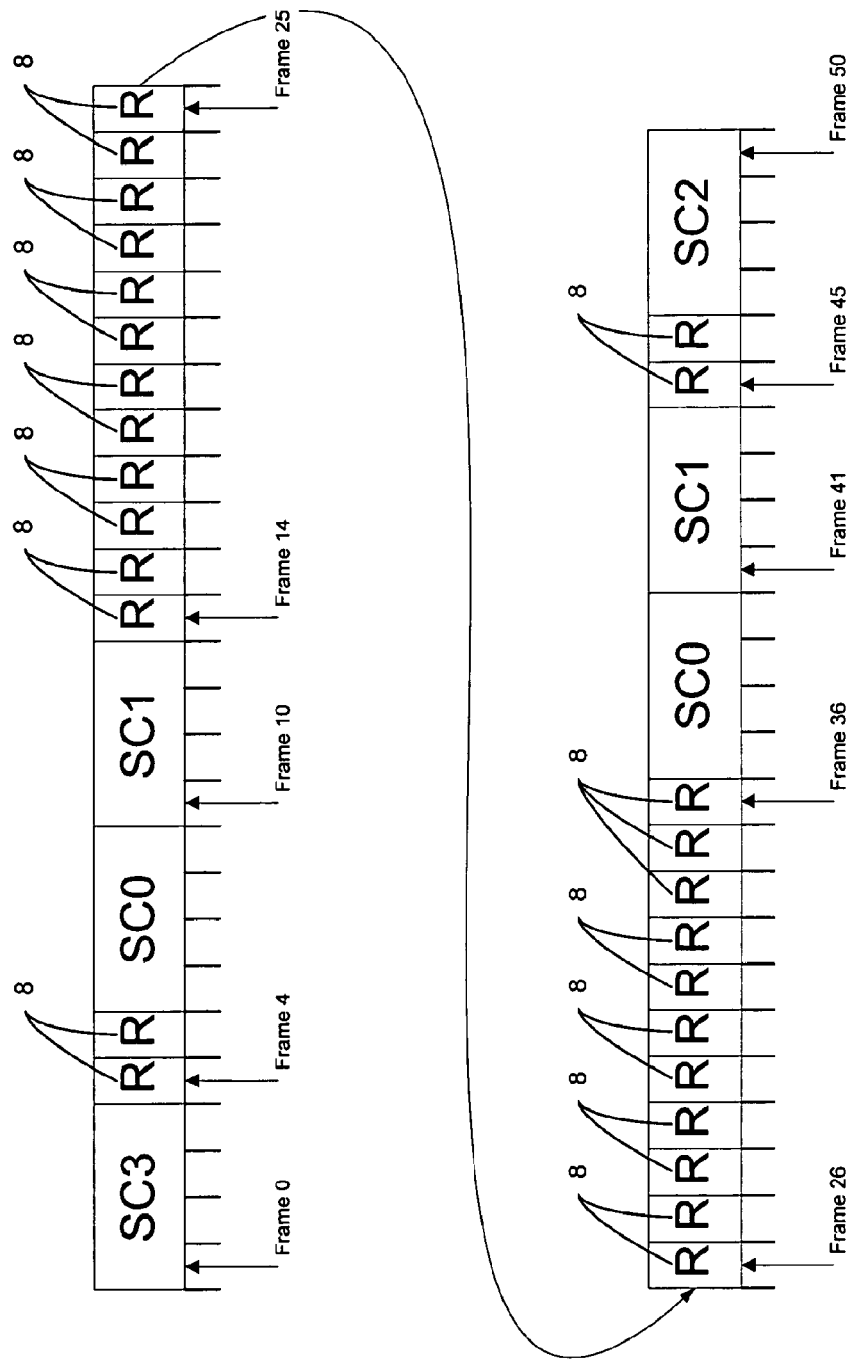
FIG. 3 shows an exemplary Uplink Sub-frame Map adapted for use with the Random Access Burst method.
Figure 4:
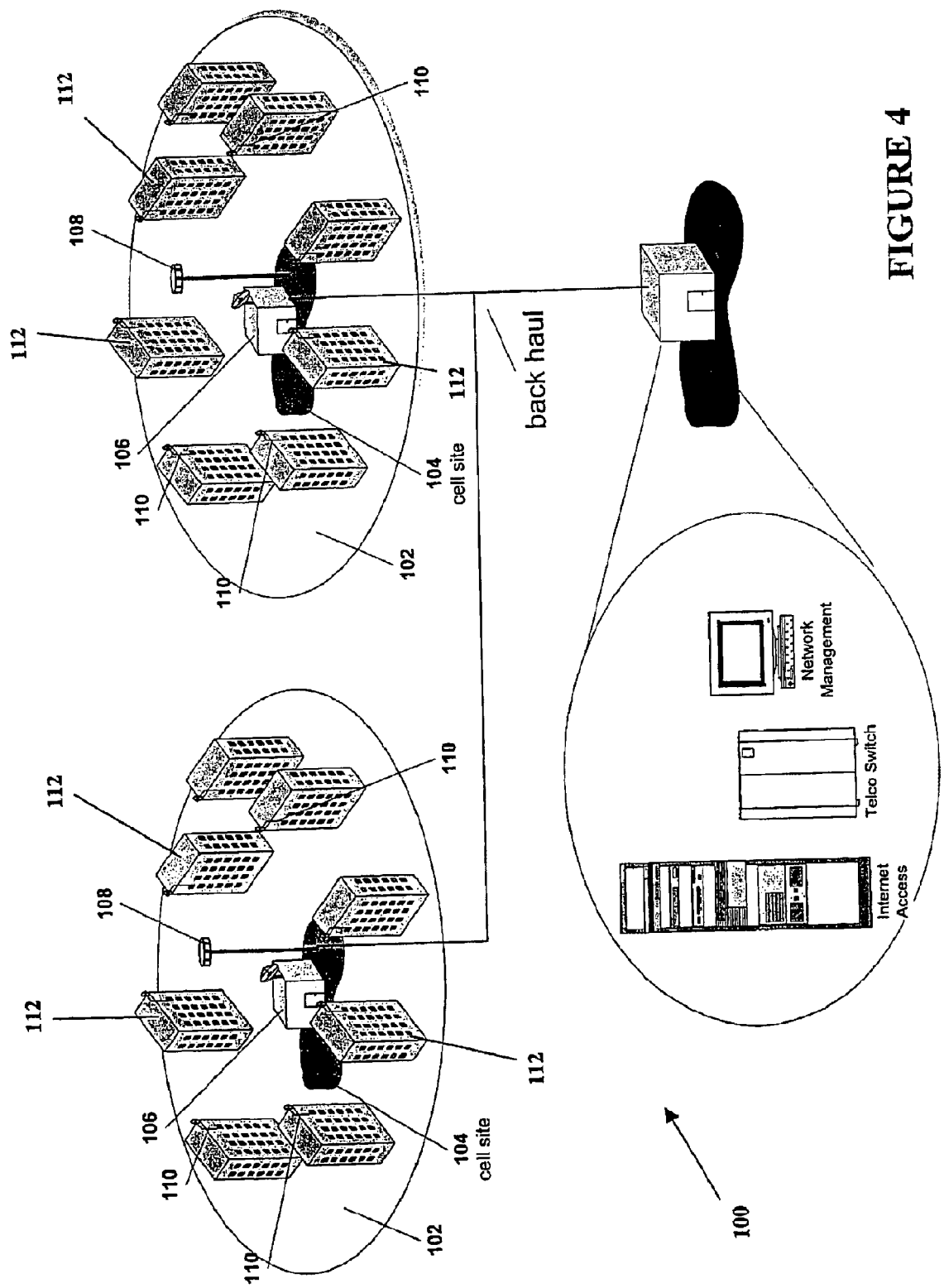
FIG. 4 shows a block diagram of an exemplary broadband wireless communication system that can be used to practice the present invention.

Overview of Time-Synchronized Communication System for Use with the Present Access and Ranging Invention An exemplary broadband wireless communication system for use with the present invention is described in the commonly assigned U.S. Pat. No. 6,016,311, and is shown in the block diagram of FIG. 4. The exemplary broadband wireless communication system facilitates two-way communication between a plurality of base stations and a plurality of fixed subscriber stations or Customer Premises Equipment (CPE). As shown in FIG. 4, the exemplary broadband wireless communication system 100 includes a plurality of cells 102. Each cell 102 contains an associated cell site 104 that primarily includes a base station 106 and an active antenna array 108. Each cell 102 provides wireless connectivity between the cell's base station 106 and a plurality of customer premises equipment (CPE) 110 positioned at fixed customer sites 112 throughout the coverage area of the cell 102. The users of the system 100 may include both residential and business customers. Consequently, the users of the system have different and varying usage and bandwidth requirement needs. Each cell may service several hundred or more residential and business CPEs.

The broadband wireless communication system 100 of FIG. 4 provides true "bandwidth-on-demand" to the plurality of CPEs 110. CPEs 110 request bandwidth allocations from their respective base stations 106 based upon the type and quality of services requested by the customers served by the CPEs. Different broadband services have different bandwidth and latency requirements. The type and quality of services available to the customers are variable and selectable. The amount of bandwidth dedicated to a given service is determined by the information rate and the quality of service required by that service (the bandwidth allocation also accounts for bandwidth availability and other system parameters). For example, T1-type continuous data services typically require a great deal of bandwidth having well-controlled delivery latency. Until terminated, these services require constant bandwidth allocation for each frame. In contrast, certain types of data services such as Internet protocol data services (TCP/IP) are bursty, often idle (which at any one instant may require zero bandwidth), and are relatively insensitive to delay variations when active.

The base station media access control ("MAC") is responsible for allocating available bandwidth on a physical channel on the uplink and the downlink. Within the uplink and downlink sub-frames, the base station MAC allocates the available bandwidth between the various services depending upon the priorities and rules imposed by their quality of service ("QoS"). The MAC determines when subscribers are allowed to transmit on the physical medium. In addition, if contentions are permitted, the MAC controls the contention process and resolves any collisions that may occur. The MAC transports data between a MAC "layer" (information higher layers such as TCP/IP) and a "physical layer" (information on the physical channel).

Due to the wide variety of CPE service requirements, and due to the large number of CPEs serviced by any one base station, the bandwidth allocation process in a broadband wireless communication system such as that shown in FIG. 4 can become burdensome and complex. This is especially true with regard to rapidly transporting data while maintaining synchronization between the MAC and physical communication protocol layers. Base stations transport many different data types (e.g., T1 and TCP/IP) between the MAC and physical layers through the use of data protocols. One objective of a communication protocol is to efficiently transport data between the MAC and physical layers. A communication protocol must balance the need for transmitting data at maximum bandwidth at any given time against the need for maintaining synchronization between the MAC and physical layers when the data is lost during transportation.

In the system shown in FIG. 4, the MAC is typically executed by software processed by the base stations 106 (in some embodiments, the software may execute on processors both in the base stations and the CPE). The base stations 106 receive requests for transmission rights and grant these requests within the time available taking into account the priorities, service types, quality of service and other factors associated with the CPEs 110. The services provided by the CPEs 110 vary and include, at one end of the service spectrum, TDM information such as voice trunks from a PBX. At the other end of the service spectrum, the CPEs may uplink bursty yet delay-tolerant computer data for communication with the well-known World Wide Web or Internet.

The base station MAC maps and allocates bandwidth for both the uplink and downlink communication links. These maps are developed and maintained by the base station and are referred to as the Uplink Sub-frame Maps and Downlink Sub-frame Maps. The MAC must allocate sufficient bandwidth to accommodate the bandwidth requirements imposed by high priority constant bit rate (CBR) services such as T1, E1 and similar constant bit rate services. In addition, the MAC must allocate the remaining system bandwidth across the lower priority services such as Internet Protocol (IP) data services. The MAC distributes bandwidth among these lower priority services using various QoS dependent techniques such as fair-weighted queuing and round-robin queuing.

The downlink of the communication system shown in FIG. 4 operates on a point-to-multi-point basis (i.e., from the base station 106 to the plurality of CPEs 110). As described in the related commonly assigned U.S. Pat. No. 6,016,311, the central base station 106 includes a sectored active antenna array 108 which is capable of simultaneously transmitting to several sectors. In one embodiment of the system 100, the active antenna array 108 transmits to six independent sectors simultaneously. Within a given frequency channel and antenna sector, all stations receive the same transmission. The base station is the only transmitter operating in the downlink direction, hence it transmits without having to coordinate with other base stations, except for the overall time-division duplexing that divides time into upstream (uplink) and downstream (downlink) transmission periods. The base station broadcasts to all of the CPEs in a sector (and frequency). The CPEs monitor the addresses in the received messages and retain only those addressed to them.

The CPEs 110 share the uplink on a demand basis that is controlled by the base station MAC. Depending upon the class of service utilized by a CPE, the base station may issue a selected CPE continuing rights to transmit on the uplink, or the right to transmit may be granted by a base station after receipt of a request from the CPE. In addition to individually addressed messages, messages may also be sent by the base station to multicast groups (control messages and video distribution are examples of multicast applications) as well as broadcast to all CPEs.

Frame Maps—Uplink and Downlink Sub-frame Mappings

In one preferred embodiment of the present invention, the base stations 106 maintain sub-frame maps of the bandwidth allocated to the uplink and downlink communication links. The present inventive method and apparatus can be used with any communication system where the uplink comprises a Time-Division Multiple Access (TDMA) modulation scheme. For example, a frequency division duplex (or "FDD") or a time-division duplex (or "TDD") modulation scheme can be used. As described in more detail in the commonly assigned and related U.S. Pat. No. 6,016,311, the uplink and downlink can be multiplexed in a TDD manner. In one embodiment, a frame is defined as comprising N consecutive time periods or time slots (where N remains constant). In accordance with this "frame-based"-approach, the communication system dynamically configures the first $N_1$ time slots (where N is greater than or equal to $N_1$) for downlink transmissions only. The remaining $N_2$ time slots are dynamically configured for uplink transmissions only (where $N_2$ equals $N-N_1$). Under this TDD frame-based scheme, the downlink sub-frame is preferably transmitted first and is pre-fixed with information that is necessary for frame synchronization.

Figure 5A:
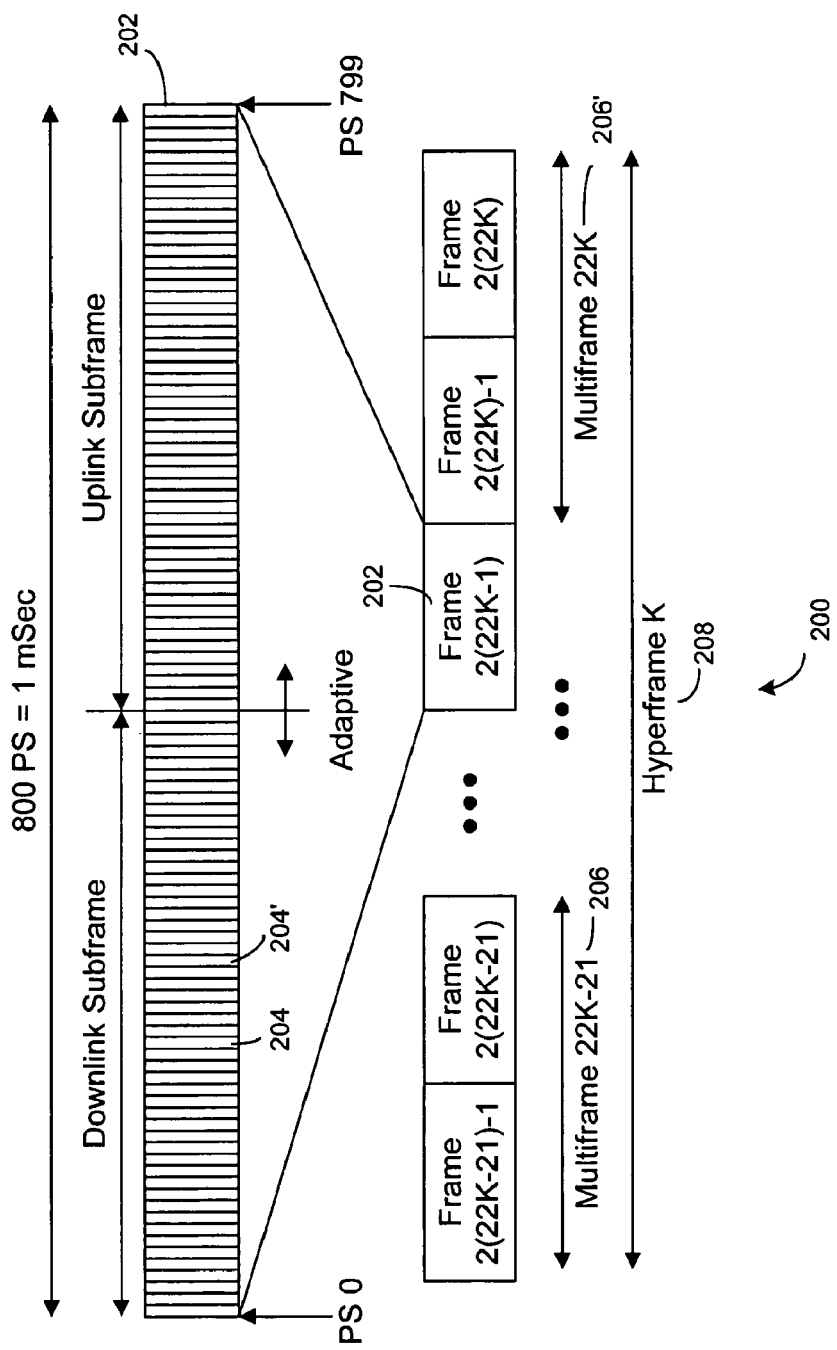
FIG. 5a shows a TDD frame and multi-frame structure that can be used by a communication system (such as that shown in FIG. 4) in practicing the present invention.

FIG. 5a shows a TDD frame and multi-frame structure 200 that can be used by a communication system (such as that shown in FIG. 4) in practicing the present invention. As shown in FIG. 5a, the TDD frame 200 is subdivided into a plurality of physical slots (PS) 204, 204'. In the embodiment shown in FIG. 5a, the frame is one millisecond in duration and includes 800 physical slots. Alternatively, the present invention can be used with frames having longer or shorter duration and with more or fewer PSs. The available bandwidth is allocated by a base station in units of a certain pre-defined number of PSs. Some form of digital encoding, such as the well-known Reed-Solomon encoding method, is performed on the digital information over a pre-defined number of bit units referred to as information elements (PI). The modulation may vary within the frame and determines the number of PS (and therefore the amount of time) required to transmit a selected PI.

As described in more detail the in the commonly assigned related U.S. Pat. No. 6,016,311, in one embodiment of the broadband wireless communication system shown in FIG. 4, the TDD framing is adaptive. That is, the number of PSs allocated to the downlink versus the uplink varies over time. The present inventive data transportation and synchronization method and apparatus can be used in both adaptive and fixed TDD systems using a frame and multi-frame structure similar to that shown in FIG. 5a. As shown in FIG. 5a, to aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises twenty-two multi-frames 206. Alternatively, other frame, multi-frame and hyper-frame structures can be used to practice the present invention. For example, in another embodiment of the present invention, each multi-frame 206 comprises sixteen frames 202, and each hyper-frame comprises thirty-two multi-frames 206.

Figure 5B:
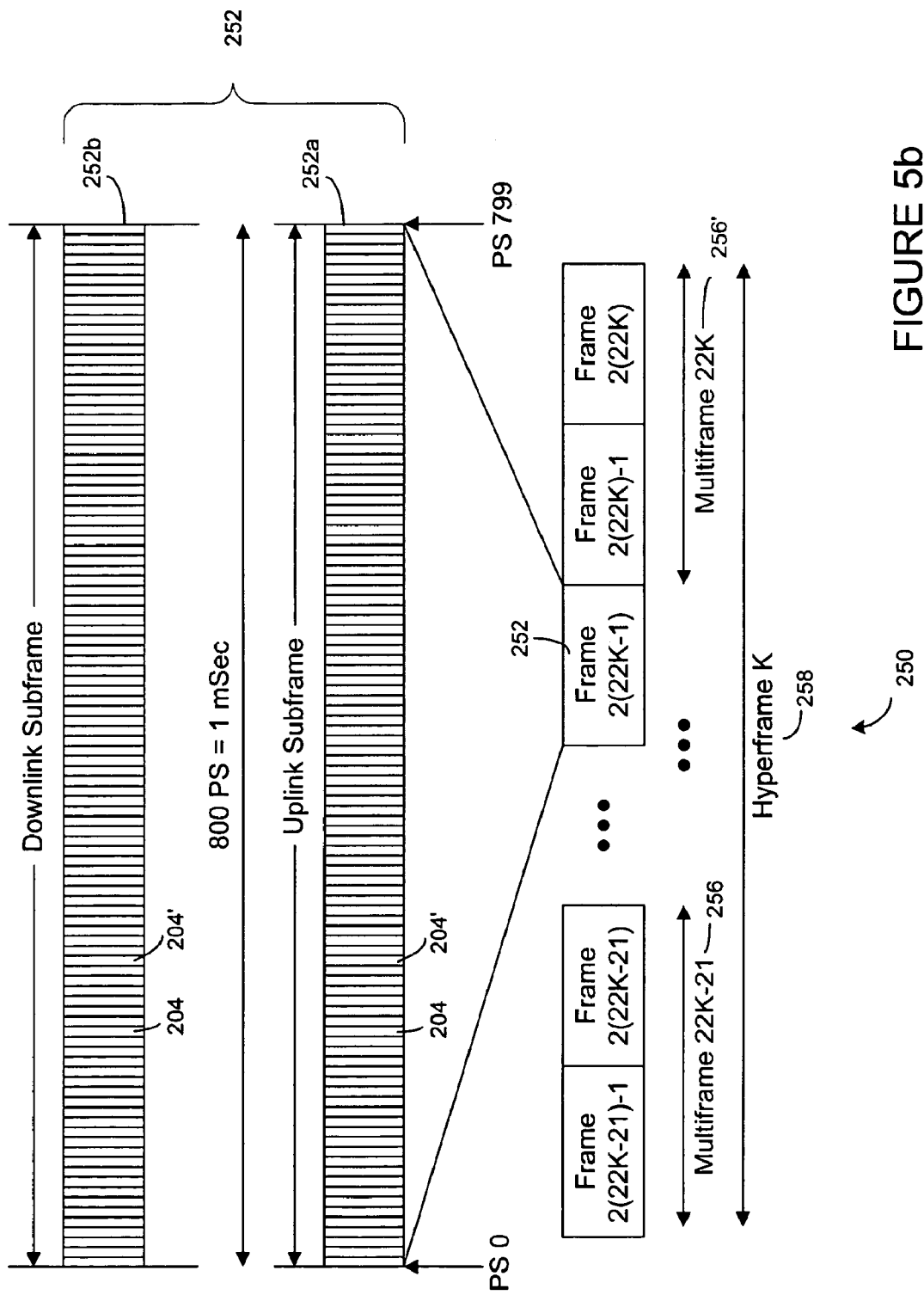
FIG. 5b shows a FDD frame and multi-frame structure that can be used by a communication system (such as that shown in FIG. 4) in practicing the present invention.

FIG. 5b shows an FDD frame and multi-frame structure 250 that can be used by a communication system (such as that shown in FIG. 4) in practicing the present invention. As shown in FIG. 5b, the FDD frame 250 comprises a plurality of frames 252 wherein each frame 252 preferably comprises an uplink subframe 252a and a downlink subframe 252b. The FDD frame 250 is preferably subdivided into a plurality of physical slots (PS) 204, 204'. In the embodiment shown in FIG. 5b, the frame is one millisecond in duration and includes 800 physical slots per subframe. Alternatively, the present invention can be used with frames having longer or shorter duration and with more or fewer PSs. The available bandwidth is allocated by a base station in units of a certain pre-defined number of PSs. Some form of digital encoding, such as the well-known Reed-Solomon encoding method, is performed on the digital information over a pre-defined number of bit units referred to as information elements (PI). The modulation may vary within the frame and determines the number of PS (and therefore the amount of time) required to transmit a selected PI.

As shown in FIG. 5b, to aid periodic functions, multiple frames 252 are grouped into multi-frames 256, and multiple multi-frames 256 are grouped into hyper-frames 258. In one embodiment, each multi-frame 256 comprises two frames 252, and each hyper-frame comprises twenty-two multi-frames 256. Alternatively, other frame, multi-frame and hyper-frame structures can be used to practice the present invention. For example, in another embodiment of the present invention, each multi-frame 256 comprises sixteen frames 252, and each hyper-frame comprises thirty-two multi-frames 256. Exemplary downlink and uplink sub-frames used in practicing the present invention are shown respectively in FIGS. 6 and 7.

Downlink Sub-Frame Map

Figure 6:
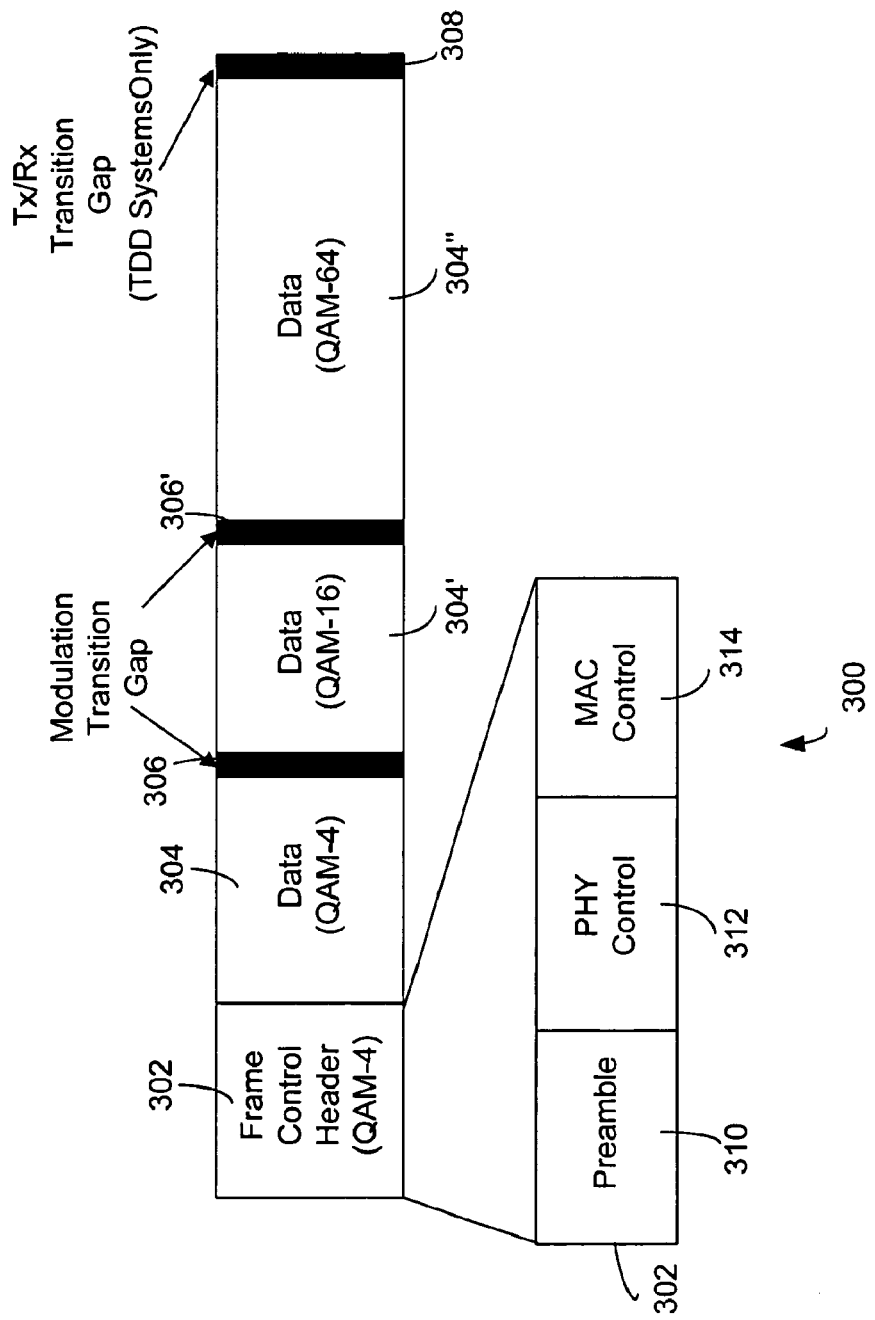
FIG. 6 shows one example of a downlink sub-frame that can be used by the base stations of FIG. 4 to transmit information to a plurality of CPEs.

FIG. 6 shows one example of a downlink sub-frame 300 that can be used by the base stations 106 to transmit information to the plurality of CPEs 110. The base station preferably maintains a downlink sub-frame map that reflects the downlink bandwidth allocation. The downlink sub-frame 300 preferably comprises a frame control header 302, a plurality of downlink data PSs 304 grouped by modulation type (e.g., PS 304 data modulated using a QAM-4 modulation scheme, PS 304' data modulated using QAM-16, etc.) and possibly separated by associated modulation transition gaps (MTGs) 306 used to separate differently modulated data, and a transmit/receive transition gap 308. As those skilled in the wireless communications art shall appreciate, the transmit/receive transition gap 308 is utilized in TDD systems only (i.e., it is not used in FDD systems). In any selected downlink sub-frame any one or more of the differently modulated data blocks may be absent. In one embodiment, modulation transition gaps (MTGs) 306 are 0 PS in duration; As shown in FIG. 6, the frame control header 302 contains a preamble 310 that is used by the physical protocol layer (or PHY) for synchronization and equalization purposes. The frame control header 302 also includes control sections for both the PHY (312) and the MAC (314).

The downlink data PSs are used for transmitting data and control messages to the CPEs 110. This data is preferably encoded (using, for example, a Reed-Solomon encoding scheme) and transmitted at the current operating modulation used by the selected CPE. Data is preferably transmitted using a pre-defined modulation sequence: such as QAM-4, followed by QAM-16, followed by QAM-64. The modulation transition gaps 306 contain preambles and are used to separate the modulations. The PHY Control portion 312 of the frame control header 302 preferably contains a broadcast message indicating the identity of the PS 304 at which the modulation scheme changes. Finally, as shown in FIG. 6, the Tx/Rx transition gap 308 separates the downlink sub-frame from the uplink sub-frame (TDD systems only).

Uplink Sub-Frame Map

Figure 7:
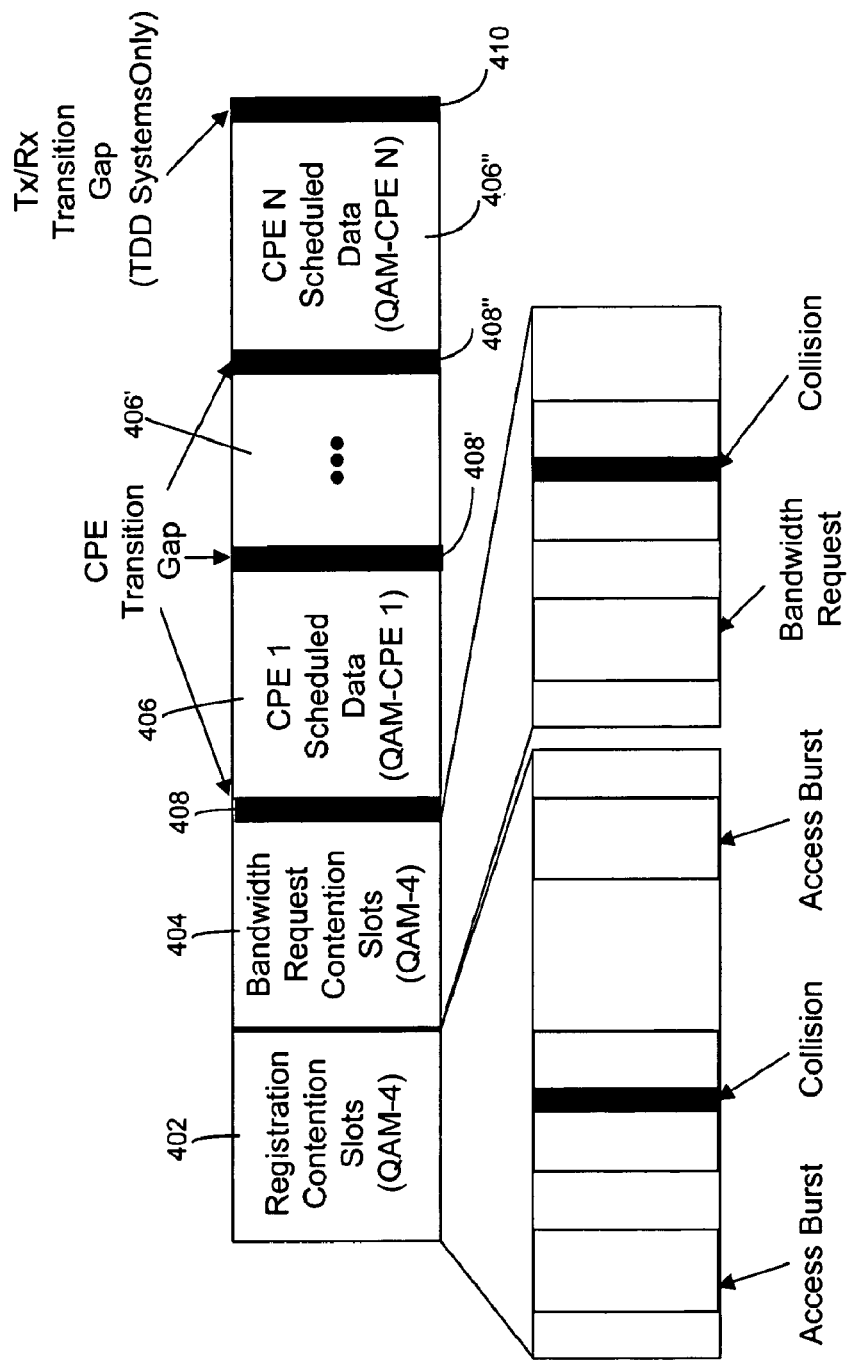
FIG. 7 shows one example of an uplink sub-frame that can be used to practice the present invention.

FIG. 7 shows one example of an uplink sub-frame 400 that can be used to practice the present invention. In accordance with the present method and apparatus, the CPEs 110 (FIG. 4) use the uplink sub-frame 400 to transmit information (including the transmission of bandwidth requests) to their associated base stations 106. As shown in FIG. 7, there are three main classes of MAC control messages that are transmitted by the CPEs 110 during the uplink frame: (1) those that are transmitted in contention slots reserved for CPE registration (Registration Contention Slots 402); (2) those that are transmitted in contention slots reserved for responses to multicast and broadcast polls for bandwidth allocation (Bandwidth Request Contention Slots 404); and those that are transmitted in bandwidth specifically allocated to individual CPEs (CPE Scheduled Data Slots 406).

The bandwidth allocated for contention slots (i.e., the contention slots 402 and 404) is grouped together and is transmitted using a pre-determined modulation scheme. For example, in the embodiment shown in FIG. 7 the contention slots 402 and 404 are transmitted using a QAM-4 modulation. The remaining bandwidth is grouped by CPE. During its scheduled bandwidth, a CPE 110 transmits with a fixed modulation that is determined by the effects of environmental factors on transmission between that CPE 110 and its associated base station 106. The uplink sub-frame 400 includes a plurality of CPE transition gaps (CTGs) 408 that serve a function that is similar to the modulation transition gaps (MTGs) 306 described above with reference to FIG. 6. That is, the CTGs 408 separate the transmissions from the various CPEs 110 during the uplink sub-frame 400. In one embodiment, the CTGs 408 are 2 physical slots in duration. A transmitting CPE preferably transmits a 1 PS preamble during the second PS of the CTG 408 thereby allowing the base station to synchronize to the new CPE 110. A transmit/receive transition gap 410 is utilized in TDD systems only (i.e., it is not used in FDD systems). Multiple CPEs 110 may transmit in the registration contention period simultaneously resulting in collisions. When collisions occur the base station may not respond.

Multiple Initialization and Synchronization within a Single Contiguous Time Window The present invention efficiently utilizes bandwidth by searching for multiple initial access bursts from multiple mobile stations during a single contiguous time period known as a "new access opportunity". The preferred embodiment of the present invention initializes and synchronizes in a "contention-based" manner. The term "contention-based" refers to the possibility of two or more access bursts (m) simultaneously arriving at the base station, thus producing a collision. Advantageously, the present invention decreases the amount of bandwidth that must be allocated for the purpose of initializing the mobile stations using the present inventive method and apparatus, multiple initial access bursts can be received in a relatively short time period by taking advantage of the new access opportunities. Thus, the amount of bandwidth wasted on unused time periods is reduced.

Figure 8A:
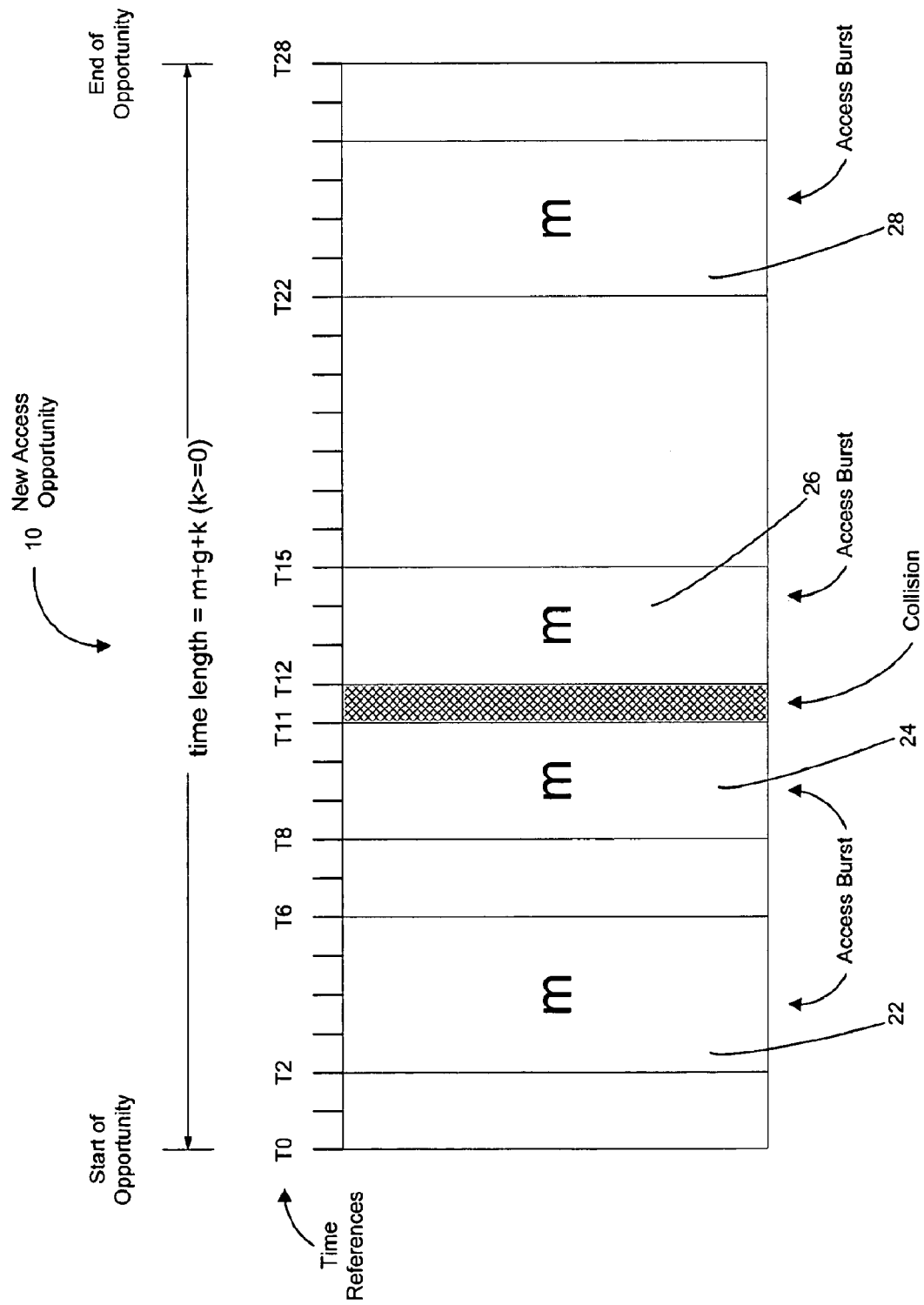
FIG. 8a shows a first exemplary new access opportunity (NAO) in accordance with the present invention.

FIG. 8a shows a first exemplary new access opportunity (NAO) 10 in accordance with the present invention. As shown in FIG. 8a, the new access opportunity 10 has a duration that is equal to m+g+k; where m is the access burst duration, g is the maximum round-trip delay duration, and k is a time period greater than or equal to zero microseconds. The duration of the NAO 10 begins at a time interval known as a "Start of Opportunity" and ends at a time interval known as an "End of Opportunity". In the exemplary embodiment, the Start of Opportunity occurs at time reference T0 and the End of Opportunity occurs at time reference T28. Subscriber units randomly send access bursts (m) to the base station for initialization and synchronization purposes. Thus, the base station can receive access bursts (m) at any time within the NAO 10. When a subscriber unit's access burst (m) arrives during the NAO 10, the subscriber unit can initialize and synchronize with the base station if a collision does not occur.

Collisions occur when two or more access bursts (m) simultaneously arrive at the base station. Referring again to FIG. 8a, access bursts 22, 24, 26 and 28 begin arriving at the base station at time references T2, T8, T11 and T22, respectively. Access bursts 22, 24, 26 and 28 finish arriving at the base station at time references T6, T12, T15 and T26, respectively. Therefore, as shown in FIG. 8a, the access bursts 24 and 26 collide during the time period between time reference T11 and T12. In accordance with the present invention a contention process is implemented to resolve collisions.

One exemplary contention process for use with the present invention resolves a collision by rejecting all access bursts that are involved in the collision. Thus, all subscriber units associated with the rejected access bursts do riot initialize and synchronize with the base station and must transmit another access burst to the base station in order to initialize and synchronize with the base station. The exemplary contention process is not meant to be a limitation to the present invention as different contention processes can be used without departing from the scope or spirit of the present invention. Contention processes are well known, and thus, are not described in more detail herein.

Figure 8B:
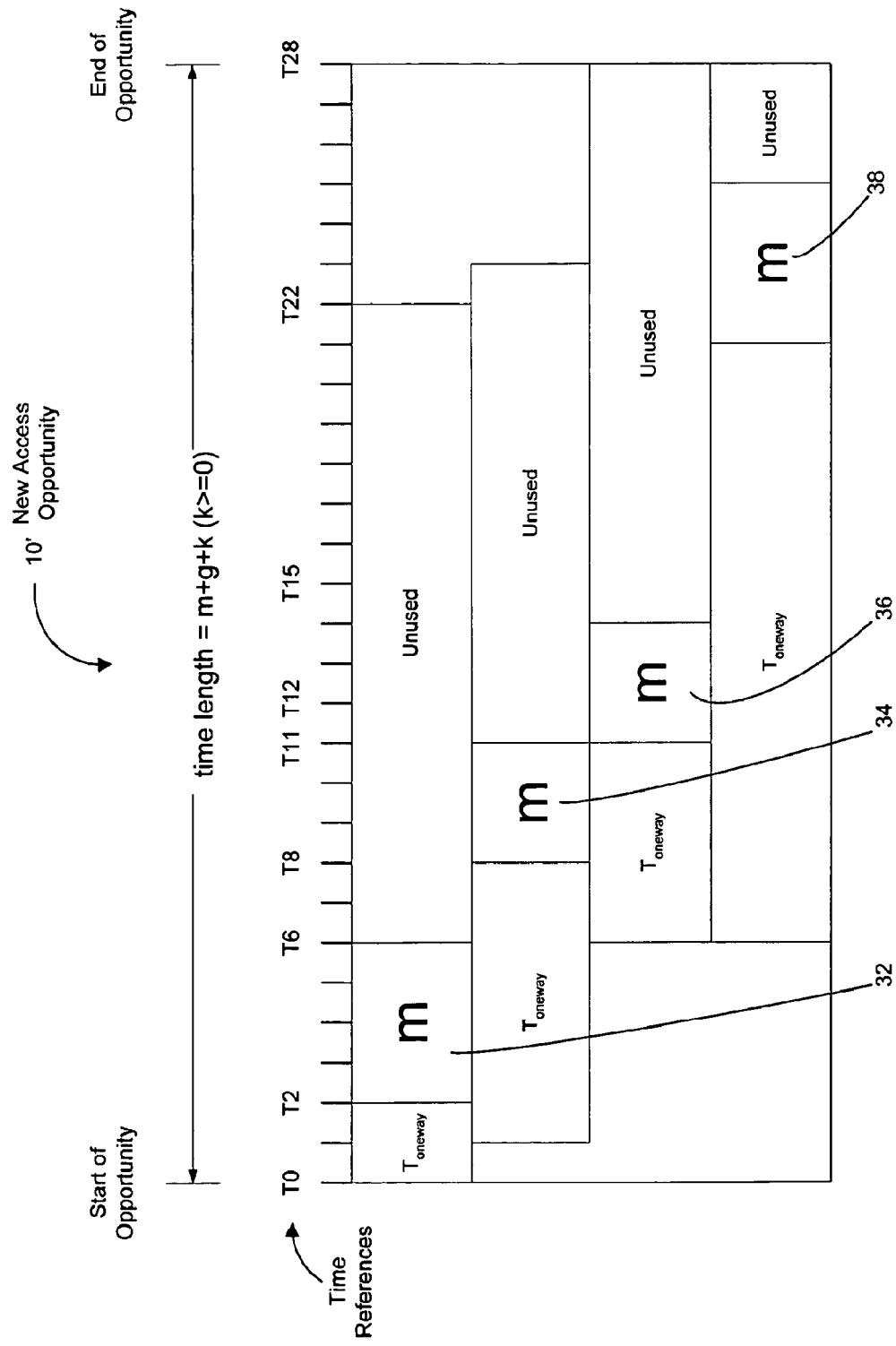
FIG. 8b shows a second exemplary new access opportunity (NAO) in accordance with the present invention.

FIG. 8b shows a second exemplary new access opportunity (NAO) 10' in accordance with the present invention. The second exemplary NAO 10' illustrates the multiple initialization and synchronization of CPEs within a single contiguous time window or NAO 10' of the present invention. As shown in FIG. 8b, the near access opportunity 10' has a duration EQUAL to m+g+k; where m is the access burst duration, g is the maximum round-trip delay duration, and k is a time period greater than or equal to zero microseconds. The duration of the NAO 10' begins at a time interval known as a "Start of Opportunity" and ends at a time interval known as an "End of Opportunity". In the exemplary embodiment the Start of Opportunity occurs at time reference T0 and the End of Opportunity occurs at time reference T28. Subscriber units randomly send access bursts (m) to the base station for initialization and synchronization purposes. Thus, the base station can receive access bursts (m) at any time within the NAO 10'. When a subscriber unit's access burst (m) arrives during the NAO 10', the subscriber unit can initialize and synchronize with the base station.

As shown in FIG. 8b, access bursts 32, 34, 36 and 38 begin arriving at the base station at time references T2, T8, T11 and T21, respectively. Access bursts 32, 34, 36 and 38 finish arriving at the base station at time references T6, T11, T14 and T25, respectively. Therefore, as shown in FIG. 8b, the access bursts 32, 34, 36 and 38 initialize and synchronize within a single contiguous time window or NAO 10'.

Advantageously, the present invention allows multiple access bursts to be received by the base station during the new access opportunity 10. Equation 1 shows the maximum number of access bursts that can be received by the base station during the NAO 10.

$$\text{Maximum number of access bursts} = (m+g+k)/m \quad \text{(Equation 1)}$$

where m=the access burst duration
g=the maximum round-trip delay duration
k=a time period greater than or equal to zero microseconds In most wireless communication systems, g will be much greater than m. Thus, when the NAO 10 is at a minimum length (i.e., k equals zero), more than one access burst (m) can be received by the base station. Thus, the present invention advantageously allows multiple access bursts (m) to be received by the base station during a single contiguous time period. In the preferred embodiment, when k is greater than zero, subscriber units randomize their transmission send time, thus, further reducing the probability of collisions at any given moment during the NAO 10. Random transmission methods are well known in the communication arts, and thus, are not described in more detail herein.

Round-trip delay or Tx time advance is preferably calculated using data contained in the access burst (m) that is transmitted by subscriber units to associated base stations. Specifically, m preferably contains the subscriber unit's "send" time (i.e., time that the subscriber unit transmitted the access burst) and identification data (i.e., data that uniquely identifies the subscriber unit). In accordance with the present invention, the subscriber unit preferably is provided with the maximum round-trip delay time (g) for the system. Subscriber units may use any of a wide variety of well-known methods to obtain the maximum round-trip delay time (g). These methods are not described in more detail herein.

Figure 9:
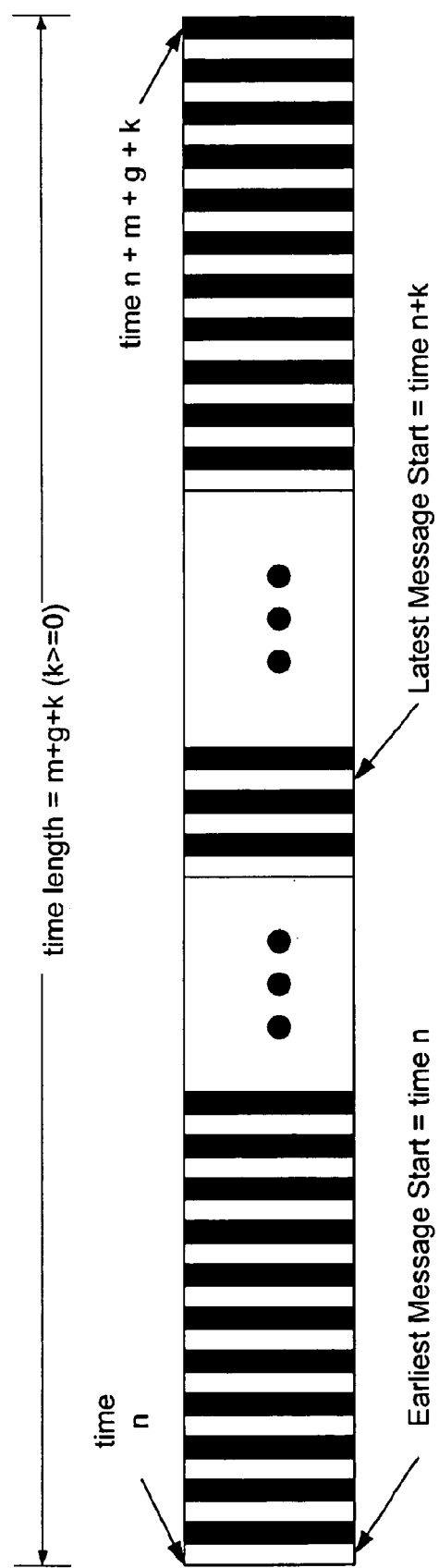
FIG. 9 shows an exemplary new access opportunity of the present invention beginning at a time n.

FIG. 9 shows an exemplary new access opportunity of the present invention beginning at a time n. As shown in FIG. 9, the NAO 10 begins at time n and ends at time n+m+g+k. The earliest time that a base station can receive an access burst message during the NAO 10 is time n. The latest time that a base station can receive an access burst message during the NAO 10 is time n+k because a message arriving later than time n+k would be only partially received due to the length of the message i.e., the NAO 10 would end before the arrival of the end of the message). Between the earliest time (time n) and the latest time (time n+k) that a base station can receive access burst messages, the base station advantageously can receive multiple access burst (m) messages.

Summary

In summary, the subscriber unit initialization and synchronization method and apparatus of the present invention includes a powerful and highly efficient means for initializing and synchronizing subscriber units in a time-synchronized communication system. The present subscriber unit initialization and synchronization method and apparatus uses a combination of an access burst format and a data transportation technique to efficiently use bandwidth for initialization and synchronization purposes. Advantageously, the present invention provides a mechanism for a base station to receive multiple access bursts from multiple subscriber units in a single contiguous time period.

A number of embodiments of the present invention have been described. Nevertheless, it will be understood that various modifications may be made without departing from the spirit and scope of the invention. For example, the present inventive method and apparatus can be used in any type of time-synchronized communication system and its use is not limited to a wireless communication system. One such example is use of the invention in a cable modem communication system. In such a communication system, cable modem "boxes" replace the subscriber units described above. Alternatively, the present invention can be used in a satellite communication system. In such a communication system satellites replace the base stations described above. Accordingly, it is to be understood that the invention is not to be limited by the specific illustrated embodiment, but only by the scope of the appended claims.

What is claimed is:

1. An apparatus, comprising:
a base station;
a media access control (MAC) element included in the base station and executed by a processor of the base station and configured to:
provide a contiguous new access opportunity time period on a frequency channel; and
provide one or more reserved time periods, different from the contiguous time period, for transmission to and from terminal stations on the frequency channel; and
an antenna coupled to the base station and configured to receive uplink communications from terminal stations,
wherein the contiguous new access opportunity time period has a duration of m+g+k, where m is an access burst duration, g is a maximum round-trip delay duration, and k is a time period greater than or equal to zero, wherein m, g, and k are real numbers, and
wherein if k is greater than zero, the antenna receives the uplink communications from terminal stations that randomize their transmission send time to reduce probability of collisions during the contiguous new access opportunity time period.

2. The apparatus of claim 1 wherein the antenna is further configured to:
receive a first registration message from a first unregistered terminal station during a first portion of the contiguous new access opportunity time period; and
receive a second registration message from a second unregistered terminal station during a second portion of the contiguous new access opportunity time period.

3. The apparatus of claim 2 wherein the MAC element is further configured to:
detect a collision of the first registration message and the second registration message, and
reject the first and second registration messages that have collided.

4. The apparatus of claim 1 wherein the MAC element is configured to provide the contiguous new access opportunity time period in an uplink bandwidth map of the frequency channel.

5. A method, comprising:
mapping, by a base station, onto an uplink map of a frequency channel:
a contiguous new access opportunity time period; and
one or more reserved time periods, different from the contiguous new access opportunity time period, for transmission to and from terminal stations;
wherein the contiguous new access opportunity time period has a duration of m+g+k, where m is an access burst duration, g is a maximum round-trip delay duration, and k is a time period greater than or equal to zero, wherein m, g, and k are real numbers, and
receiving, by said base station and if k is greater than zero, uplink communications from terminal stations that randomize their transmission send time to reduce probability of collisions during the contiguous new access opportunity time period.

6. The method of claim 5, further comprising:
receiving, by the base station, a first registration message from a first unregistered terminal station beginning on a first time slot of the contiguous new access opportunity time period; and receiving, by the base station, a second registration message from a second unregistered terminal station beginning on a second time slot of the contiguous new access opportunity time period.

7. The method of claim 6, further comprising:
detecting, by the base station, a collision of the first registration message and the second registration message; and
rejecting, by the base station, the first and second registration messages that have collided.

8. The method of claim 5, further comprising mapping, by the base station, a bandwidth request time period onto the uplink map of the frequency channel.

9. The method of claim 8, further comprising:
receiving, by the base station from a first registered terminal station, a first bandwidth request beginning on a first time frame of the bandwidth request time period; and
receiving, by the base station from a second registered terminal station, a second bandwidth request beginning on a second time frame of the bandwidth request time period.

10. An article of manufacture, comprising:
a non-transitory computer-readable medium having processor-executable instructions stored thereon that are executable by a processor of a base station to:
map onto an uplink map of a frequency channel:
a contiguous new access opportunity time period; and
one or more reserved time periods, different from the contiguous new access opportunity time period, for transmission to and from terminal stations;
wherein the contiguous new access opportunity time period has a duration of m+g+k, where m is an access burst duration, g is a maximum round-trip delay duration, and k is a time period greater than or equal to zero, wherein m, g, and k are real numbers, and
receive, if k is greater than zero, uplink communications from terminal stations that randomize their transmission send time to reduce probability of collisions during the contiguous new access opportunity time period.

11. The article of manufacture of claim 10 wherein:
a first registration message is received by said base station from a first unregistered terminal station beginning on a first time slot of the contiguous new access opportunity time period,
a second registration message is received by said base station from a second unregistered terminal station beginning on a second time slot of the contiguous new access opportunity time period.

12. The article of manufacture of claim 11 wherein the non-transitory computer readable medium further includes instructions stored thereon that are executable by said processor to, if said base station detects a collision of the first registration message and the second registration message, cause said base station to reject the first and second registration messages that have collided.

13. The article of manufacture of claim 11 wherein the non-transitory computer readable medium further includes instructions stored thereon that are executable by said processor to map a bandwidth request time period onto the uplink map of the frequency channel.

14. The article of manufacture of claim 13 wherein the non-transitory computer readable medium further includes instructions stored thereon that are executable by said processor to:

process a first bandwidth request, received by the base station from a first registered terminal station, beginning on a first time frame of the bandwidth request time period; and process a second bandwidth request, received by the base station from a second registered terminal station, beginning on a second time frame of the bandwidth request time period.

* * * * *